United States Patent [19]

Gooding et al.

[11] 3,906,400

[45] Sept. 16, 1975

[54] TRANSFER FUNCTION REALIZATION WITH ONE-BIT COEFFICIENTS

[75] Inventors: Dennis Jay Gooding, Acton; Peter Holden Anderson, Sudbury, both of Mass.

[73] Assignee: Adams-Russell Co., Waltham, Mass.

[22] Filed: Dec. 17, 1973

[21] Appl. No.: 425,250

[52] U.S. Cl................ 332/11 D; 325/38 B; 325/42; 328/167; 333/18 R; 333/70 T

[51] Int. Cl.[2]...................... H03R 13/22; H03H 7/10

[58] Field of Search......... 328/167; 332/11 R, 11 D; 325/38 R, 38 B, 42; 333/18 R, 70 T

[56] References Cited

UNITED STATES PATENTS

| | | | |
|---|---|---|---|
| 3,081,434 | 3/1963 | Sandberg | 328/167 X |
| 3,633,170 | 1/1972 | Jones | 332/11 D X |
| 3,639,848 | 2/1972 | Elliott | 328/167 |
| 3,723,911 | 3/1973 | Forney | 328/167 X |
| 3,822,404 | 7/1974 | Groisier et al. | 325/38 B |

*Primary Examiner*—Alfred L. Brody
*Attorney, Agent, or Firm*—Charles Hieken; Jerry Cohen

[57] ABSTRACT

A tapped delay unit includes an input terminal for receiving an input signal and a number of taps for furnishing signals related to the input signal delayed by progressively increasing time intervals. A one-bit multiplier representative of either the binary digit ONE or ZERO couples a respective delay tap to a summing network that provides as an output the sum of the individual outputs provided by the multipliers. In one form of the invention the tapped delay unit is a tapped delay line. In another form of the invention the storage unit is a shift register or other memory device. According to another aspect of the invention the input signal is applied to a delta modulator that provides a sequence of binary samples, and the output of the summing network is a sequence of pulses applied to an accumulator.

7 Claims, 3 Drawing Figures

TRANSFER FUNCTION REALIZATION WITH ONE-BIT COEFFICIENTS

BACKGROUND OF THE INVENTION

The present invention relates in general to realization of desired transfer functions, including frequency-selective filtering, and more particularly concerns novel apparatus and techniques for non-recursive realization of transfer functions using weighting coefficients quantized to only one bit while retaining the desirable transfer characteristics normally associated with weighting coefficients requiring many bits of quantization in prior art techniques.

It is well-known that the frequency response $H(\omega)$ of a linear system is the Fourier transform of the corresponding impulse response $h(t)$. Traditionally, filters have been designed in the frequency domain by synthesizing a system having a desired $H(\omega)$ for a given application, such as a filter for transmitting a predetermined band of spectral components. Later, time domain synthesis techniques evolved.

Where the application was such that the desired output signal as a function of time in response to a known input signal as a function of time was known, the convolution integral could be applied directly to determine $h(t)$. If the desired frequency response were known, $H(\omega)$ could be transformed into $h(t)$ by an inverse Fourier transformation. A convenient physical realization for time domain synthesis is a tapped delay line, a gain controller multiplier associated with each tap of the delay line and a summing network for combining the outputs of each gain controller to provide an output that approximates the desired output in response to an impulse applied to the input, because the output of each gain controller is representative of a sample of the desired output waveform at a time corresponsing to the delay represented by the associated tap. A disadvantage of this prior art approach is that applying the correct gain for each tap introduces undesired complexities since the gain must be set to high precision and takes on a wide range of values from tap to tap.

Accordingly, it is an important object of this invention to provide methods and means for simplifying the realization of systems for providing a desired response in the time domain.

It is another object of the invention to achieve the preceding object with gain control that may be represented by one or the other of two values (1 binary digit).

It is still a further object of the invention to achieve one or more of the preceding objects with a system in which effectively only multiplications of binary digits occur.

It is a further object of the invention to achieve one or more of the preceding objects with system realizations especially convenient to implement with digital techniques that facilitate realiable and economical realization on a large scale.

SUMMARY OF THE INVENTION

According to the invention, there is delay means having a plurality of output taps each associated with a corresponding delay interval between the input terminal and respective output tap for furnishing a predetermined incremental delay to an input signal applied to the input. A gain controller is associated with each tap for furnishing either the positive or negative value of a predetermined fixed gain, $a$, to the output signal on an associated tap for providing from each tap the signal multiplied by the gain factor, $a$, or its negative for application to summing means which provides as an output signal the sum of the signals transmitted from the taps. According to another feature of the invention, the input signal may be delta modulated to provide a train of positive and negative impulses so that all the required multiply operations represent one-bit by one-bit multiplies, operations readily implemented. The required summing of the products may be readily performed using digital counting circuits.

Numerous other features, objects and advantages of the invention will become apparent from the following specification when read in connection with the accompanying drawing in which:

DETAILED DESCRIPTION OF PREFERRED EMBODIMENTS

Figure 1:
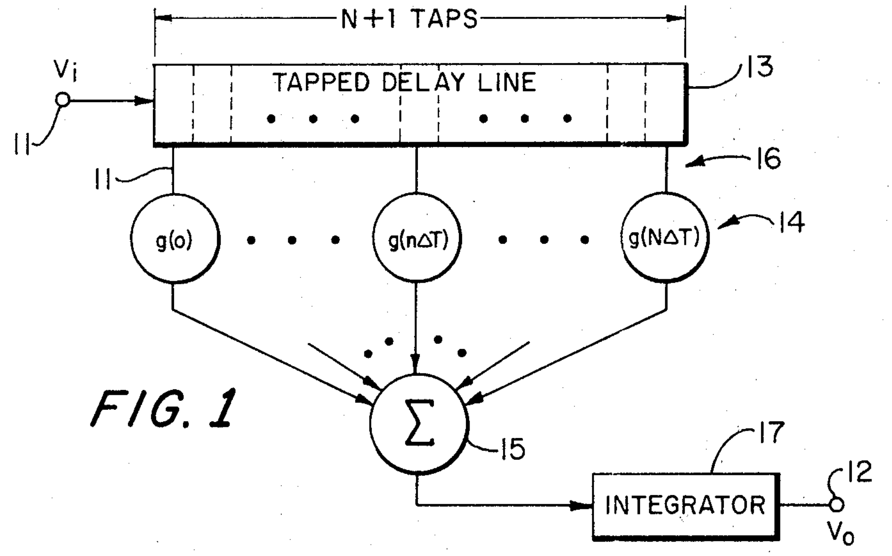
FIG. 1 is a block diagram illustrating the logical arrangement of an analog implementation of a filter according to the invention.

With reference now to the drawing and more particularly FIG. 1 thereof, there is shown the logical arrangement of a system according to the invention in which the filtered version of an input signal $V_i$ applied at input terminal 11 arrives on output terminal 12 after processing by tapped delay line 13, gain control units 14, summer 15 and integrator 17. Delay line 13 has N+1 taps, the first of which is input terminal 11 to provide N delay intervals of $\Delta T$. Each of the output taps 16 is connected to the input of a respective one of gain control unit 14, each imparting a gain of either $+a$ or $-a$ to the signal on the associated tap 16 depending on the impulse response of the associated interval, generally designated $g(n\Delta T)$, the first being $g(O)$, the last being $g(T)$. One particular desirable choice of sequence of tap gains $g(n\Delta T)$ corresponds to the sequence of sample values that would be obtained by delta modulation encoding of the desired overall impulse response $h(t)$ using a delta modulator sample period $\Delta T$ and an output sample value of $+a$. This relationship provides a constructive method of selecting the appropriate tap gains $g(n\Delta T)$ to implement a filter or other transfer function having desired overall impulse response $h(t)$. In this choice of $g(n\Delta T)$, the gain is $\pm a$, depending on whether the desired impulse response $h(t)$ at a a particular tap increases or decreases from the response at the preceding tap. Relative constancy over an interval large compared to $\Delta T$ may be represented by a sequence of alternating positive and negative coefficients over the interval. By choosing N large enough and $\Delta T$ appropriately, a desired impulse response may be synthesized to virtually any practical degree of accuracy.

The outputs of each of the gain control units 14 are cumulatively combined in summer 15 and integrated in integrator 17 to provide an output signal $V_o$ on terminal 12 that represents the response of a system to the input signal on terminal 11 characterized by the Fourier transform of the desired overall impulse response of the system.

Figure 2:
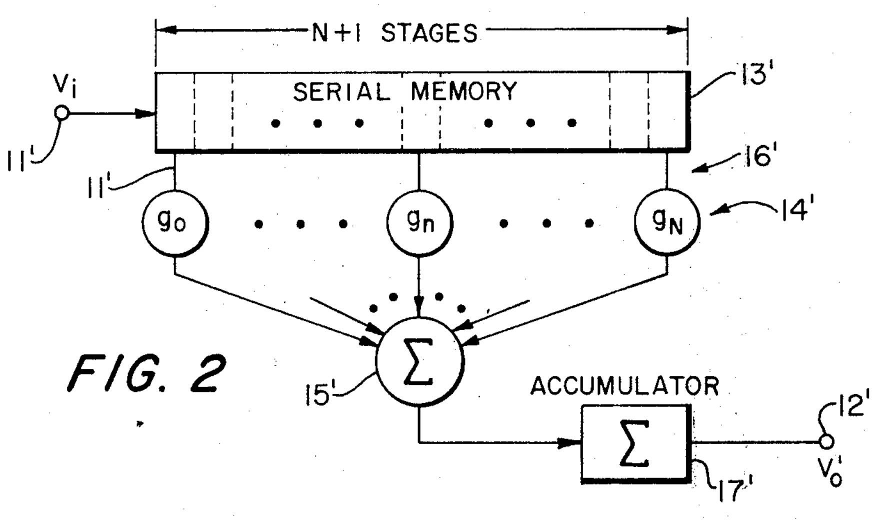
FIG. 2 is a block diagram illustrating the logical arrangement of a digital filter according to the invention.

Referring to FIG. 2, there is shown another embodiment of the invention in which the input signal $V_i$ is a digital signal, and the output signal $V_o'$ on output terminal 12' is a digital signal corresponding to a digital approximation of processing the digitally represented input signal with a filter having an impulse response $h(t)$ approximated by the system of FIG. 2. The means for furnishing a delay comprises an N+1-stage serial memory 13', such as a shift register 13' having N+1 output taps 16', the first of which corresponds to input terminal 11'. Associated with each tap is a one bit multiplier 14' for multiplying the binary output digit on the respective output tap 16' with +1, representable by binary ONE and ZERO, respectively. The outputs of the respective one-bit multipliers 14' are additively combined in summer 15' to provide a train of digital bit pulses that are carried in accumulator 17' whose count is the output signal $V_o'$ in the form of a multi-bit sampled representation of the filtered response to the train of digital numbers $V_1'$ applied at input terminal 11'.

Figure 3:
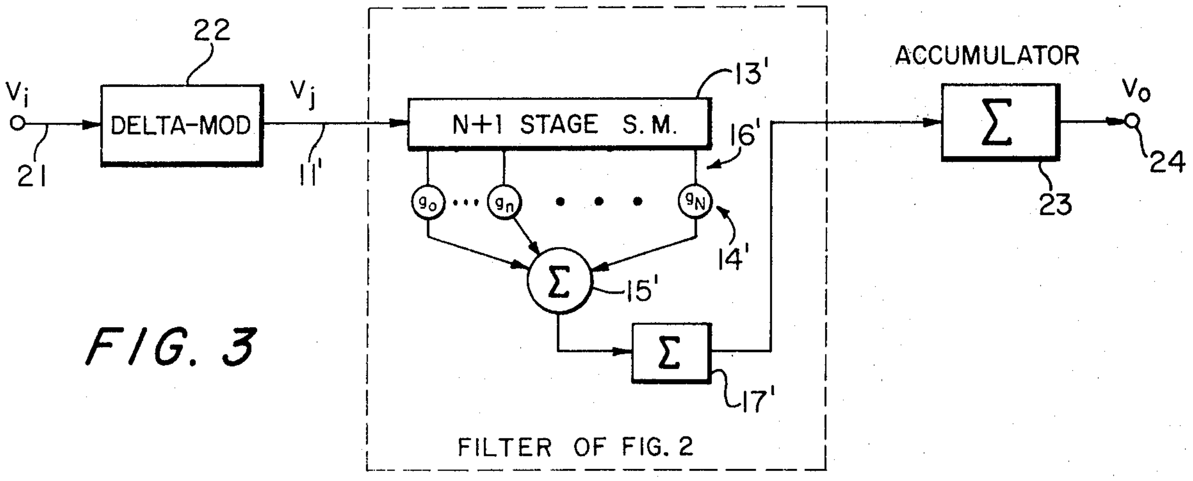
FIG. 3 illustrates a modified form of the invention in which the input signal is delta modulated.

Referring to FIG. 3, there is shown the embodiment of FIG. 2 in which an analog signal $V_i$ is applied to input 21 of delta modulator 22 having an output $V_j$ that is applied to input terminal 11' in the form of a train of positive and negative pulses whose average value over a duration short compared to the period of the input signal being sampled is representative of the input signal amplitude. An output accumulator 23 receives the sequence of output signal samples provided by accumulator 17' and accumulates them to provide on output terminal 24 a digital representation of the filtered input signal $V_i$.

Delta modulation systems are well-known in the art and not a part of this invention. For background a delta modulation system will be briefly described. A representative delta modulation system includes means for sampling an input analog signal. The sampled input signal is compared with a sum of the output samples provided by a feedback accumulator, and the difference is hard limited to some quantization step size. The output is a sequence of positive and negative impulses of equal amplitude spaced equally in time with the accumulated sample pulses being representative of the instantaneous amplitude of the input signal. A demodulator may comprise an accumulator whose instantaneous count is representative of the instantaneous amplitude of the quantized input signal.

There has been described novel apparatus and techniques for approximating a given desired system response. The value of each gain control unit may be permanently wired to effect a fixed transfer characteristic that remains unchanged for a specific apparatus. Alternatively, it is within the principles of the invention to selectively change the various binary coefficients, such as manually with ordinary switches, or dynamically, such as by having the gain control units 14 and 14' comprise AND gates having one leg connected to an output tap and another leg connected to a shift register stage or other suitable means for designating a bit. Changing the digital number stored in this shift register or other suitable means would effectively change a system transfer characteristics. Numerous other departures from and modifications of the specific embodiments described herein may now be practiced by those skilled in the art without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Non-recursive filtering a apparatus for establishing a predetermined transfer characteristic between an input terminal and an output terminal comprising, a plurality of output taps, delay means for furnishing a predetermined delay to a signal applied to said input terminal between said input terminal and each of said taps, a gain control unit associated with each of said taps for transmitting the signal associated with the associated tap with gain of substantially constant amplitude and a selected one of positive and negative polarities, said gain of substantially constant amplitude being the same for each gain control unit, means for cumulatively combining the outputs from each of said gain control units to provide an output signal on said output terminal corresponding to said input signal applied to said input terminal modified in accordance with the transfer characteristic determined by said delay means, said gain control units and said means for cumulatively combining, and integrating means responsive to said output signal for providing an integrated output signal representative of the time integral of said output signal.

2. Apparatus for establishing a predetermined transfer characteristic in accordance with claim 1 wherein said delay means comprises a tapped delay line.

3. Apparatus for establishing a predetermined transfer characteristic in accordance with claim 1 wherein said delay means comprises a serial memory for storing binary digits and said means for integrating comprises an accumulator for receiving the signals provided by said means for cumulatively combining.

4. Apparatus for establishing a predetermined transfer characteristic in accordance with claim 3 and further comprising, means for delta modulating an analog input signal to provide a delta modulation representation thereof, means for coupling the delta modulated representation to the input of said delay means, and a second accumulator for receiving signals provided by the first-mentioned accumulator.

5. A method of nonrecursively filtering an input signal which method includes the steps of, furnishing a predetermined plurality of different delays to said input signal to provide a corresponding plurality of delayed signals, imparting a predetermined gain to each delayed signal of substantially constant amplitude and a selected one of positive and negative polarities to provide a corresponding plurality of gain-controlled delay signals, said gain of substantially constant amplitude being the same for each delayed signal, cumulatively combining the gain-controlled delayed signals to provide an output signal, and integrating said output signal to provide an integrated output signal representative of the time integral of said output signal.

6. A method of processing an input signal in accordance with claim 5 and further including, providing said input signal in digital form, and imparting said gain to each delayed signal by digital multiplication, the step of combining the gain-controlled delayed signals including accumulating said signals.

7. A method of processing an input signal in accordance with claim 6 and further including the step of delta modulating an analog signal to provide as said input signal a delta modulated signal.

* * * * *